United States Patent [19]
Krenzel

[11] Patent Number: 5,276,596
[45] Date of Patent: Jan. 4, 1994

[54] HOLDER FOR A FLASHLIGHT

[76] Inventor: Ronald L. Krenzel, 6595 Odell, Ste. 1, Boulder, Colo. 80301

[21] Appl. No.: 902,940

[22] Filed: Jun. 23, 1992

[51] Int. Cl.⁵ ............................................. F21L 15/14
[52] U.S. Cl. .................................. 362/191; 362/396; 362/419
[58] Field of Search ............... 362/190, 191, 418, 419, 362/421, 396

[56] References Cited

U.S. PATENT DOCUMENTS

| | | | |
|---|---|---|---|
| 1,566,502 | 12/1925 | Palmer | 362/808 |
| 2,706,610 | 4/1955 | Roberts | 362/191 |
| 3,307,026 | 2/1967 | Kramer | 362/191 |
| 3,418,461 | 12/1968 | Sedlock | 362/191 |
| 3,584,822 | 6/1971 | Oram | 362/421 |
| 4,907,137 | 3/1990 | Schladitz et al. | 362/421 |
| 5,103,384 | 4/1992 | Drohan | 362/421 |

*Primary Examiner*—Richard R. Cole
*Attorney, Agent, or Firm*—Klaas, Law, O'Meara & Malkin

[57] ABSTRACT

This invention provides an elongated flexible member that is capable of being formed into a plurality of differing shapes so that it can be supported at a variety of locations and has retaining means for retaining it in a desired shape so that a holder connected to one end thereof can hold a flashlight at any desired position relative thereto.

10 Claims, 1 Drawing Sheet

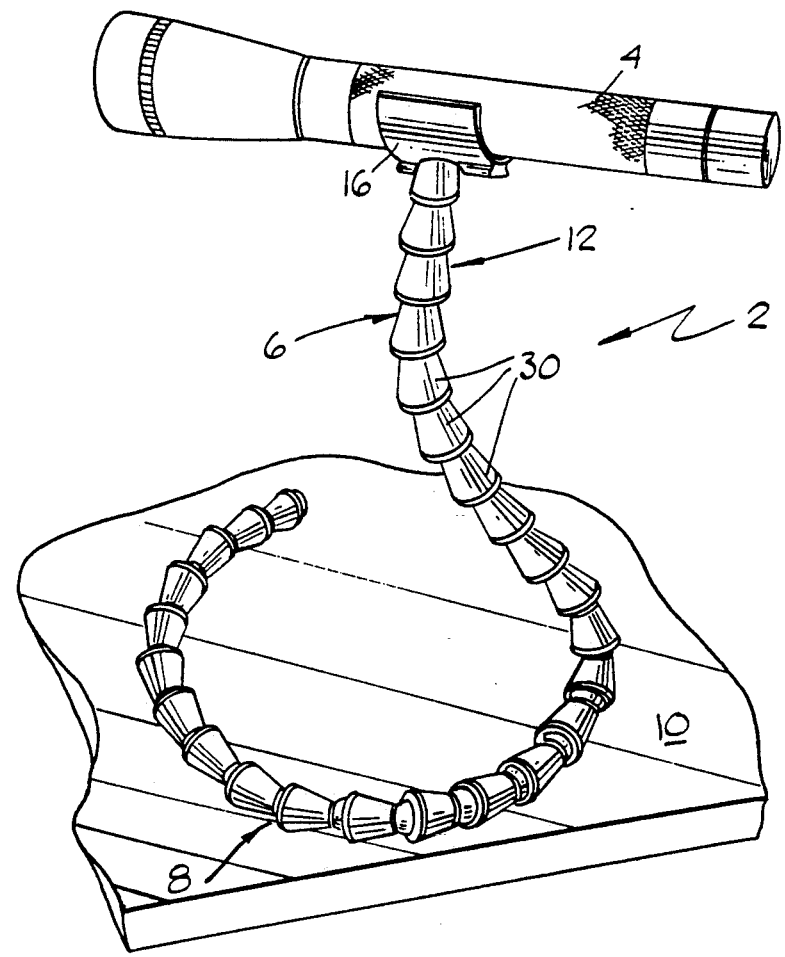
FIG.1
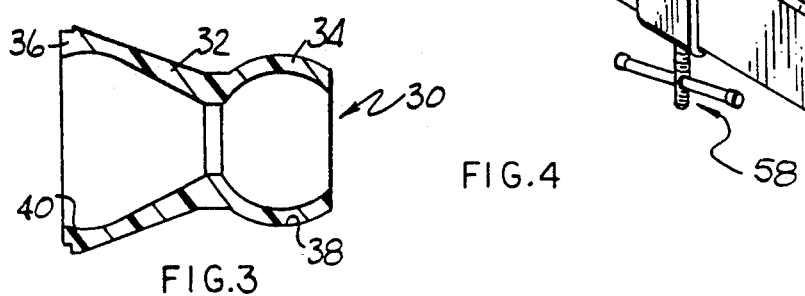
FIG.2
FIG.3
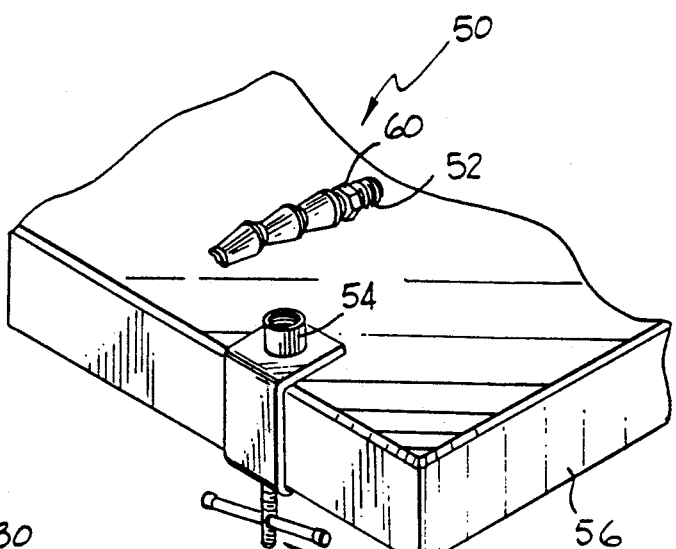
FIG.4

HOLDER FOR A FLASHLIGHT

FIELD OF THE INVENTION

This invention relates generally to apparatus for use in providing light where necessary and more particularly, to a portable device for holding a flashlight at any desired location.

BACKGROUND OF THE INVENTION

There are many times when a person, who is alone and doing some kind of work, needs a third hand. This is particularly true when a flashlight has to be used so that such a person can see what is being worked on. Flashlights have been laid on any available objects in an effort to provide light at a desired location, but often without good results. Small flashlights have even been held in the mouth of the worker. Thus, there exists a need for a readily portable device that can be used anywhere to hold a flashlight at a desired location to provide needed light.

BRIEF DESCRIPTION OF THE INVENTION

This invention relates to a device that is readily portable and can be used substantially anywhere to hold a flashlight to provide needed light at a desired location.

In a preferred embodiment of the invention, the device comprises an elongated flexible member that is capable of being moved into a plurality of differing shapes. Retaining means are provided for retaining the elongated flexible member in a desired shape. Holding means are provided on one end portion of the elongated flexible member for holding a flashlight. Generally, the desired shape has a base portion which is adapted to be placed on a fixed surface. A generally vertically extending portion projects upwardly from the base portion. The holding means are connected to an end portion of the elongated flexible member by suitable connecting means, such as a rivet. The holding means comprise a member having a generally arcuate cross-sectional configuration having an arcuate extent greater than 180 degrees and a longitudinal axis. The member is formed from a resilient material, such as a plastic material, and has spaced apart terminal end portions which may be spread apart so that a flashlight can be inserted into the member and so that the terminal end portions will resile back to exert frictional forces on the flashlight to restrain relative movement between the member and the flashlight. The flashlight also has a longitudinal axis so that when the flashlight is inserted into the member, the longitudinal axes of the member and the flashlight are in a parallel relationship.

The elongated flexible member comprises a plurality of interconnected segments each of which has a central body portion, a male end portion, a female end portion and a longitudinal axis. The male end portion has an outer surface having the configuration of a frustum of a sphere and the female end portion has an inner surface having the configuration of a frustum of a sphere and is dimensioned to receive the male end portion. The outer and inner surfaces are dimensioned so that there is frictional contact therebetween when a male end portion is inserted into a female end portion. This permits one segment to be moved relative to another segment so that their longitudinal axes are either in or out of alignment and permits unrestricted rotational movement between interconnected segments. Therefore, since the holding means is connected to the end segment, it permits the same type of movement of the flashlight. Also, the frictional forces retain the two segments at whatever relative position they have been moved to. Preferably, each segment is made from a plastic material.

In another preferred embodiment of the invention, attachment means are provided for attaching one end of the elongated flexible member to a fixed support such as an internally threaded socket mounted at a fixed location. The attachment means comprise an adapter having a central body section, an externally threaded end section, a male end section and a longitudinal axis. The male end section has an outer surface having a configuration similar to the outer surface of the male end portion so that it can be inserted into a female end portion and function as described above relative to interconnected segments. The central body section has an outer configuration adapted to be received in a tool so that the adapter can be rotated to secure the externally threaded end section into the internally threaded socket.

BRIEF DESCRIPTION OF THE DRAWING

Illustrative and presently preferred embodiments of the invention are shown in the accompanying drawing in which:

FIG. 1 is a perspective view of a device for holding a flashlight of this invention;

FIG. 2 is an end elevational view of the holding means;

FIG. 3 is a view in cross-section of one of the segments; and

FIG. 4 is a perspective view of another embodiment of this invention.

DETAILED DESCRIPTION OF THE INVENTION

In FIG. 1, there is disclosed a readily portable device 2 for holding a flashlight 4 having a longitudinal axis. The device 2 comprises an elongated flexible member 6 which is capable of being moved into a plurality of differing shapes. The shape illustrated in FIG. 1 comprises a base portion 8 adapted to be placed in contact with a support surface 10 and a generally vertically extending portion 12. Holding means 14 (FIG. 2) are provided for holding the flashlight 4 and comprise an open-ended arcuately-shaped member 16 having an arcuate extent greater than 180 degrees and having a longitudinal axis. The member 1 is preferably formed from a resilient material such as polyethylene, such as that marketed under the trade designation "DELRIN", so that the end portions 18 and 20 may be moved apart as the flashlight 4 is inserted therethrough and then spring back to retain the flashlight 4 therein. Reinforcing means 22 are preferably integrally molded with the member 16. As illustrated in FIG. 1, when the flashlight 4 has been inserted into the member 16, the longitudinal axes thereof are in a parallel relationship.

The elongated flexible member 6 may be formed into a variety of shapes other than that illustrated in FIG. 1. Such shapes include wrapping a portion of it around a pipe or rod for working under a sink, wrapping a portion around any convenient part when working on an engine and in fact, can be used anywhere.

The elongated flexible member 6 is of the type marketed by Lockwood Products, Inc. under the trade designation LOC-LINE ( ). This product is used as a modular hose system for providing high volume fluids for cooling tools, such as in cutting operations. The elongated flexible member 6 comprises a plurality of interconnected segments 30. As illustrated in FIG. 3, each segment 30 comprises a central body portion 32, a male end portion 34 and a female end portion 36. The male end portion 34 has an outer surface 38 comprising a frustum of a sphere and the female end portion 36 has a mating inner surface 40 comprising a frustum of a sphere which is dimensioned so that, when the male end portion 34 is inserted into the female end portion 36, there is frictional contact between the mating outer and inner surfaces 38 and 40. These frictional forces function as retaining means to hold one segment 30 at any desired location relative to an interconnected segment 30. However, these frictional forces can be overcome which permits interconnected segments 30 to be moved relative to each other so that their longitudinal axes are either in or out of alignment and permits unrestricted relative rotational movement therebetween. The member 16 is preferably provided with a female end portion 36 having an inner surface 40 so that it can be connected to the male end portion 34 of the end segment 30 or it can be connected to an end segment 30 by any suitable means, such as a rivet. This connection permits the flashlight 4 to have the same relative movements as the interconnected segments, as described above. The length of the elongated flexible member 16 can be changed by adding or removing segments 30.

Another embodiment of the invention is illustrated in FIG. 4. An adapter 50 has a male end portion 34 that is dimensioned to fit into a female end portion 36 and has an externally threaded end portion 52. An internally threaded socket 54 is secured to a ledge 56 by clamping means 58. The adapter 50 has a central body section 60 having an outer surface configuration so that a tool can be applied thereto and rotated to attach the adapter 50 and therefore, the elongated flexible member 6, to the socket 54.

It is contemplated that the inventive concepts herein described may be variously otherwise embodied and it is intended that the appended claims be construed to include alternative embodiments of the invention except insofar as limited by the prior art.

What is claimed is:

1. A device for holding a flashlight at a desired location comprising:
   an elongated flexible member capable of being moved into a plurality of differing shapes;
   retaining means for retaining said elongated flexible member in a desired shape;
   holding means connected to an end portion of said elongated flexible member for holding a flashlight at a desired location;
   attachment means comprising a portion of said elongated flexible member itself for attaching said elongated flexible member on a fixed object; and
   wherein said attachment means comprise:
   a central body section, a male end section, an externally threaded end section and a longitudinal axis; and
   said male end section having an outer surface having a configuration similar to that of said male end portion of said segment.

2. A device as in claim 1 and further comprising:
   connecting means for connecting said holding means to said end portion of said elongated flexible member to permit relative angular and rotational movement between said holding means and the remaining portion of said elongated flexible member.

3. A device as in claim 1 wherein said holding means comprises:
   a member having a generally arcuate cross-sectional configuration and a longitudinal axis; and
   said member having an arcuate extent greater than 180 degrees and having spaced apart terminal end portions.

4. A device as in claim 3 wherein:
   said member being formed from a resilient material so that said terminal end portions may be spread apart as said flashlight is inserted therein and function to resile back and exert a resilient force on said flashlight to hold it at a desired location.

5. A device as in claim 4 wherein:
   said elongated flexible member comprises a plurality of interconnected segments.

6. A device as in claim 5 wherein each of said segments comprises:
   a central body portion, a male end portion, a female end portion and a longitudinal axis.

7. A device as in claim 6 wherein:
   said male end portion having an outer surface comprising a frustum of a sphere; and
   said female end portion having an inner surface comprising a frustum of a sphere and dimensioned to receive said male end portion to permit relative movement between interconnected segments so that their longitudinal axes are either in or out of alignment and permits unrestricted rotational movement therebetween.

8. A device as in claim 7 wherein said retaining means comprise:
   frictional forces between said outer and inner surfaces when said male end portion is within said female end portion to retain interconnected segments in the shape to which they have been moved.

9. A device as in claim 8 wherein:
   each of said segments is formed from a plastic material.

10. A device as in claim 1 wherein:
    said central body section having an outer surface configuration for receiving a tool for rotating said attachment means.

* * * * *